3,244,733
PROCESS FOR PRODUCING ω-AMINO ACIDS

Ryoichi Wakasa and Kazuo Saotome, Tokyo, Japan, assignors to Asahi Kasei Kogyo Kabushiki Kaisha, Osaka, Japan, a corporation of Japan
No Drawing. Filed Jan. 3, 1963, Ser. No. 249,141
Claims priority, application Japan, Jan. 30, 1962, 37/2,588
2 Claims. (Cl. 260—404)

This invention relates to a process for producing pure ω-amino acids starting from ω-chloro carboxylic acids.

The ω-amino acids have the general formula:

$$H_2N(CH_2)_nCOOH$$

(in which $n$ is an integer not less than 6) and are known as raw materials of polyamide resins which are available for synthetic fibers and plastics.

The above said ω-chlorocarboxylic acids are of the general formula:

$$Cl(CH_2)_nCOOH$$

(in which $n$ is an integer not less than 6) and are employed as starting materials of ω-amino acids, for example, they can be readily and easily produced by hydrolysis of ethylene and carbon tetrachloride.

It is known that these ω-chloro carboxylic acids may be converted by amination with ammonia into the corresponding ω-amino acids in accordance with the following equation:

$$Cl(CH_2)_nCOOH + 2NH_3 = H_2N(CH_2)_nCOOH + NH_4Cl$$

As obvious from the above formula, the reaction product is an equimolecular mixture of ω-amino acid and ammonium chloride.

The separation of ω-amino acid from ammonium chloride is difficult because of their similar behavior to solvents, and requires a considerably complicated purification device. It is also known that ω-amino acids resulting from a reaction between 25% aqueous ammonium solution and ω-chloro-carboxylic acids may be separated by using cation-exchange resins from the aqueous solution mixture. (Nesmeyanov et al., Zhur. Obshch. Khim. 27, 2418 (1957)). But this ion-exchange method is expensive since a large amount of chemicals are necessary for the regeneration of ion-exchange resins. Moreover, a condensation step is further required, because the resulting reaction product is a very dilute aqueous solution.

An object of the invention is to provide an improved and commercial process for the production of pure amino acids separated or recovered from a reaction mixture which is obtained by reacting aliphatic ω-chlorocarboxylic acids with liquid ammonia.

Other objects will be apparent from the following description.

According to the present invention, it has been found that when ω-chlorocarboxylic acids are aminated with liquid ammonia, the ammonium chloride produced is soluble in liquid ammonia while the ω-amino acid is hardly soluble. Thus the separation of ammonium chloride from ω-amino acid can be readily effected.

The process of the invention is carried out by aminating ω-chloro carboxylic acids with an excess of liquid ammonia at room temperature or higher, filtering off the precipitate and cooling the resulting reaction mixture without evaporating ammonia. After the ammonium chloride and other by-products are eliminated from said precipitate by washing with liquid ammonia, pure, desalted ω-amino acid is finally obtained. On the other hand, ammonium chloride is produced by evaporating ammonia from the filtrate and washings.

The temperature at amination is 20°~100° C., preferably 35°~60° C. The cooling is effected at 0°~—50° C., preferably —40°~—20° C. The amount of liquid ammonia added is at least 20 times, and preferably 40 times or more, as much as ω-chlorocarboxylic acid in mol ratio. The greater the addition of liquid ammonia, the better will be the results.

Any water which is present in the reaction mixture dissolves ω-amino acids. Consequently, the presence of large amounts of water is undesirable for the reaction. The addition of alkalis such as sodium hydroxide accelerates the reaction, but leaves alkali salts of ω-amino acids in the precipitate and requires subsequent purification.

The by-product obtained from aminating ω-chlorocarboxylic acid with ammonia is ω,ω-imino dicarboxylic acid in accordance with the following equation.

$$2Cl(CH_2)_nCOOH + 2NH_3 \rightarrow NH[(CH_2)_nCOOH]'_2 + NH_4Cl$$

The imino compounds described above are produced when the amount of liquid ammonia to be used in amination is comparatively small. As the mol ratio of ammonia based on ω-chlorocarboxylic acid is less than 40, the production of the imino compound becomes more than 2%. Accordingly, the imino compounds, which adversely affect on the progress of the polycondensation of ω-amino acid, must be eliminated in a purification step. The ω,ω'-imino dicarboxylic acid usually insoluble in water may be readily eliminated by recrystallizing from water the reaction product from which ammonium chloride has already been removed.

The inventors of the present process have measured the solubility of ω,ω'-imino dicarboxylic acid in liquid ammonia and discovered that according to the process of the invention, the by-products can also be eliminated by washing with liquid ammonia. The solubilities of ω-amino-acids [$H_2N(CH_2)_nCOOH$, $n=6$, and 8] and ω,ω'-imino dicarboxylic acids {$NH[(CH_2)_nCOOH]_2$, $n=6$ and 8} in 100 ml. of liquid ammonia at —20°~—30° C. are tabulated below:

| Sample: | Solubility (g.) |
|---|---|
| $H_2N(CH_2)_6COOH$ | 0.135 |
| $H_2N(CH_2)_8COOH$ | 0.059 |
| $HN[(CH_2)_6COOH]_2$ | 0.063 |
| $HN[(CH_2)_8COOH]_2$ | 0.013 |

As the number of the methylene group in ω-amino acid increases, the solubility in liquid ammonia is reduced. When ammonium chloride is present in the reaction system, the solubilities of both ω-amino acid and imino compound are slightly reduced. The amount of the imino compound produced in amination is less than a few percent when liquid ammonia is sufficiently employed. Therefore, if the loss of ω-amino acid is allowed to be 5% in a purification step, the imino compound may be practically eliminated from the reaction product by filtering and washing with liquid ammonia.

The following examples further illustrate the invention. Unless otherwise specified, parts given are by weight.

Example 1

60 parts of ω-chloroenanthic acid and 180 parts of liquid ammonia were charged in an autoclave and subjected to amination at 60° C. for 8 hours. The contents were cooled to —40° C. and the precipitate produced was filtered, washed with 100 parts of liquid ammonia. After drying, 48 parts of ω-aminoenanthic acid was obtained. The yield was 90.5%. The content of chlorine in the product was 1.3% by analysis. By further recrystallizing from water, ω-aminoenanthic acid of M.P. 195° C. was obtained. In addition as a by-product, 19 parts of ammonium chloride were produced by evaporating the ammonia from said filtrate.

Example 2

55 parts of ω-chloro-pelargonic acid and 160 parts of liquid ammonia were charged in an autoclave and subjected to amination at 50° C. for 12 hours. Then the contents of the autoclave was cooled to —40° C. and the precipitate produced were filtered, washed with 120 parts of liquid ammonia. After drying, 45 parts of ω-amino pelargonic acid were obtained. The yield was 91%. The content of chlorine in the product was 1.1%. By further recrystallizing from water, ω-amino pelargonic acid of M.P. 189° C. was obtained. In addition as a by-product, 15.2 parts of ammonium chloride was produced by evaporating the ammonia from said filtrate.

What we claim is:

1. A process for the production of an ω-amino acid comprising aminating an ω-chlorocarboxylic acid of the formula:

$$Cl(CH_2)_nCOOH$$

wherein $n$ is an integer of 6 or 8 with liquid ammonia in a mol ratio of liquid ammonia with the ω-chlorocarboxylic acid of at least 20 at a temperature between 20° C. and 100° C., whereby ω-amino acid is produced as a precipitate in the ammonia and ammonium chloride is also produced which dissolves in the liquid ammonia and isolating crystals of the precipitated ω-amino acid from the resultant mixture by cooling the mixture to a temperature between 0 and —50° C. without evaporating the ammonia.

2. A process as claimed in claim 1, comprising washing the crystals of ω-amino acid with liquid ammonia and recrystallizing in water, and evaporating the ammonia from the filtrate of the reaction mixture to yield ammonium chloride as a by-product.

References Cited by the Examiner

UNITED STATES PATENTS

| | | | |
|---|---|---|---|
| 2,462,855 | 3/1949 | Genas | 260—404 |
| 2,674,607 | 4/1954 | Genas | 260—404 |
| 3,026,342 | 3/1962 | Wust | 260—404 |

OTHER REFERENCES

Nesmeyanov et al., C.A. 52, 1958, page 7149.
Nesmeyanov et al., C.A. 53, 1959, page 1139.

CHARLES B. PARKER, *Primary Examiner.*

JOSEPH P. BRUST, ROBERT V. HINES,
*Assistant Examiners.*